(12) United States Patent
Hessling

(10) Patent No.: US 8,773,044 B2
(45) Date of Patent: Jul. 8, 2014

(54) ANTI-COLLISION AIRCRAFT LIGHT

(71) Applicant: Andre Hessling, Koblenz (DE)

(72) Inventor: Andre Hessling, Koblenz (DE)

(73) Assignees: Goodrich Lighting Systems GmbH (DE); Airbus Operations GmbH (DE)

( * ) Notice: Subject to any disclaimer, the term of this patent is extended or adjusted under 35 U.S.C. 154(b) by 20 days.

(21) Appl. No.: 13/714,846

(22) Filed: Dec. 14, 2012

(65) Prior Publication Data
US 2013/0154476 A1 Jun. 20, 2013

(30) Foreign Application Priority Data

Dec. 19, 2011 (EP) .................................... 11194245

(51) Int. Cl.
*H05B 37/02* (2006.01)
(52) U.S. Cl.
USPC ........... 315/307; 315/309; 315/291; 315/224; 315/360; 315/149; 340/981; 340/469; 340/815.45; 362/470
(58) Field of Classification Search
CPC ........... H05B 33/0845; H05B 33/0854; H05B 37/02; H05B 37/029; H05B 33/0866; B60Q 1/2611; B64D 47/06
USPC ....... 315/77, 130, 149, 200 A, 291, 294, 307, 315/309, 224, 312, 360; 340/961, 981, 340/815.45; 362/470, 545, 540
See application file for complete search history.

(56) References Cited

U.S. PATENT DOCUMENTS

| 6,989,768 B2* | 1/2006 | DeMarco et al. ............. 340/981 |
| 7,055,994 B2* | 6/2006 | Martin .......................... 362/470 |
| 7,414,546 B2* | 8/2008 | Singer et al. ................... 340/961 |
| 2004/0075575 A1 | 4/2004 | DeMarco et al. |
| 2005/0093718 A1 | 5/2005 | Martin |
| 2006/0007013 A1 | 1/2006 | Singer et al. |
| 2013/0088148 A1* | 4/2013 | Hessling et al. ................ 315/77 |
| 2013/0300296 A1* | 11/2013 | Mueller ........................ 315/130 |

OTHER PUBLICATIONS

European Search Report dated Jun. 12, 2012 for Application No. 11194245.4-2422.

* cited by examiner

*Primary Examiner* — Haiss Philogene
(74) *Attorney, Agent, or Firm* — Cantor Colburn LLP

(57) ABSTRACT

An anti-collision aircraft light comprises at least one LED and a control unit for operating the at least one LED in a pulsed manner. In this anti-collision aircraft light, the control unit comprises an ambient temperature sensor for sensing the ambient temperature and an adjustable current control for setting an LED operating current depending on the sensed ambient temperature. The control unit further includes a light intensity sensor for sensing the intensity of the light emitted from the at least one LED, an integrator connected to the light sensor for integrating the sensed light intensity, and a comparator for comparing the integrated light intensity to a threshold value. The operating current for the at least one LED is interrupted as soon as the integrated light intensity is equal to the threshold value.

6 Claims, 2 Drawing Sheets

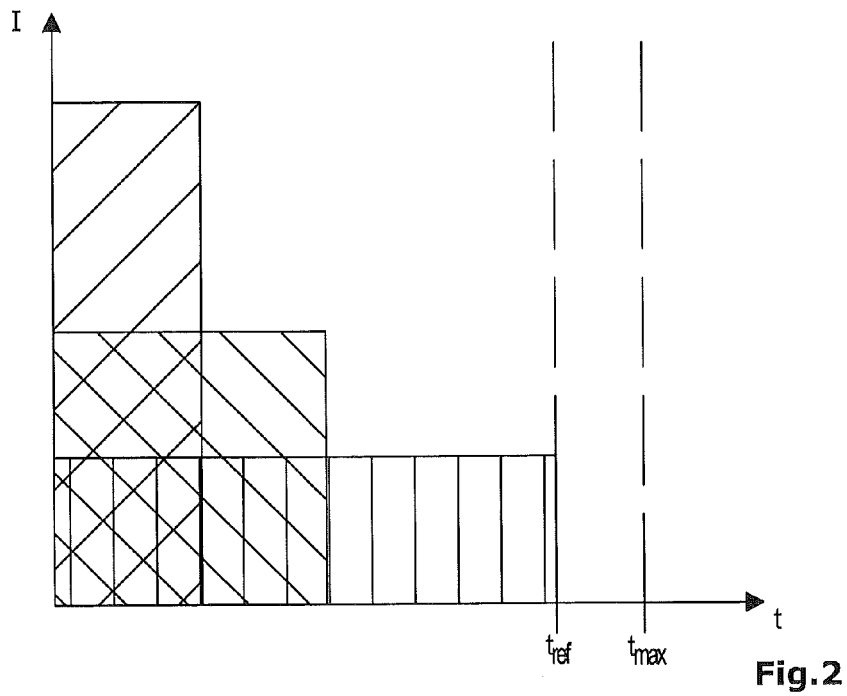

ANTI-COLLISION AIRCRAFT LIGHT

CROSS-REFERENCE TO RELATED APPLICATIONS AND PRIORITY CLAIM

This application claims priority to European Patent Application No. 11194245.4, filed Dec. 19, 2011, and all the benefits accruing therefrom under 35 U.S.C. §119, the contents of which in its entirety are herein incorporated by reference.

BACKGROUND OF THE INVENTION

The present invention relates to an anti-collision aircraft light such as a beacon aircraft light having improved visual perceptibility.

Beacon lights are known as anti-collision lights in the aircraft industry. Beacon and anti-collision lights are synonymous terms. In order to attract the required optical attention on the side of pilots, the intensity of light emitted by an anti-collision aircraft light must follow the formula of Blondel-Rey.

For maintenance and service reasons, anti-collision lights for aircrafts more and more include LEDs instead of xenon light sources. However, the properties of LEDs degrade due to aging effects. It is known that LEDs degrade depending on the temperature and over their operation time. These two influencing factors result in a reduced light intensity over time. This can be compensated by increasing the operational current supplied to the LEDs.

Accordingly, there is a need in the prior art to take into consideration aging degradation of LEDs in anti-collision lights.

SUMMARY OF THE INVENTION

The present invention provides an anti-collision aircraft light, comprising at least one LED and a control unit for operating the at least one LED in a pulsed manner, wherein the control unit comprises an ambient temperature sensor for sensing the ambient temperature, an adjustable current control means for setting an LED operating current depending on the sensed ambient temperature, a light intensity sensor for sensing the intensity of the light emitted from the at least one LED, an integrator connected to the light sensor for integrating the sensed light intensity, and a comparator for comparing the integrated light intensity to a threshold value, wherein the operating current for the at least one LED is interrupted as soon as the integrated light intensity is equal to the threshold value.

The present invention also provides a method for operating an anti-collision light comprising at least one LED and a control unit for operating the at least one LED in a pulsed manner, the method comprising the steps of sensing an ambient temperature in the surrounding of the at least one LED, adjusting an operating current for the at least one LED, the adjustable operating current being dependent on the sensed ambient temperature, sensing the intensity of the light emitted from the at least one LED when operated in a pulsed manner with an adjusted operating current, determining the amount of light emitted by the at least one LED during one pulse, and comparing the determined amount of the emitted light with a threshold value, wherein the adjusted operating current for the at least one LED is interrupted as soon as the determined amount of emitted light is equal to the threshold value.

According to the present invention, an anti-collision aircraft light comprises at least one LED and typically a plurality of LEDs, with each LED typically being operated in a pulsed manner so as to generate flashing light. For operating the at least one LED, a control unit is provided. According to the invention, this control unit comprises an adjustable current control means for setting an LED operating current which depends on the ambient temperature that the anti-collision aircraft light is subjected to. The ambient temperature is sensed by an ambient temperature sensor. In the control unit according to the present invention, typically an operating current for the at least one LED is set which is as high as possible taking into consideration the ambient temperature sensed. This means that preferably the light emitted by the at least one LED has an intensity as high as possible.

In the anti-collision aircraft light according the invention, the emitted light of the at least one LED is sensed by means of a light intensity sensor. This sensor receives the light or at least part of the light of the at least one LED and its output signal is fed to an integrator. The integrator integrates the sensed light intensity and outputs a signal which, in a comparator, is compared to a threshold value. The threshold value is a pre-set light intensity value which has to be reached by the flashing LED per each flash in order to terminate operation of the LED for the respective interval. Accordingly, the current supplied to the at least one LED is interrupted as soon as the integrated light intensity is equal to the threshold value.

In the main aspect of the invention, the flashing interval for the anti-collision aircraft light no longer is fixed but depends on the intensity of light emitted by the anti-collision aircraft light. This means that the higher the intensity of the emitted light, the shorter the interval is (wherein it can be provided that the flashing interval does not fall below a pre-set minimum value).

As mentioned above, the light intensity properties of an LED degrade over its lifetime. Accordingly, over the lifetime the operating current supplied to the LED will have to be increased in order to obtain the required light intensity. If due to aging effects the LED can no longer be operated by an operating current resulting in the relatively high light intensity as at the beginning of the lifetime of the LED, the flashing intervals will become longer and longer. In a further aspect of the present invention, the flashing interval lengths are monitored by means of e.g. a timer which is activated upon the beginning of a flashing interval and is terminated at the end of a flashing interval. The end of the flashing interval depends on the integrated light intensity reaching the pre-set threshold intensity value. If the flashing interval becomes longer than a pre-set value, a warning signal is generated indicative of the at least one LED or the plurality of the LEDs reaching the end of their lifetime. Therefore, as soon as the flashing interval exceeds the pre-set interval value, a near-end-of-lifetime indication is generated. Accordingly, in this aspect of the present invention, the control unit of the anti-collision aircraft light further comprises a timer activated upon beginning of a pulsed operation control of the at least one LED and sensing the time interval within which the integrated sensed light intensity reaches the threshold value and wherein the control unit generates a warning signal indicative of the sensed time interval exceeding a pre-set value.

As already mentioned above, the integrator typically calculates the light intensity corresponding to the effective light intensity according to the formula of Blondel-Rey.

BRIEF DESCRIPTION OF THE DRAWINGS

The present disclosure is illustrated by way of example and not limited in the accompanying figures in which like reference numerals indicate similar elements.

FIG. 2 shows the decrease of the light intensity over time and correspondingly the increase of the required flashing interval for operating the anti-collision aircraft light in the required manner.

DESCRIPTION OF A PREFERRED EMBODIMENT

Figure 1:
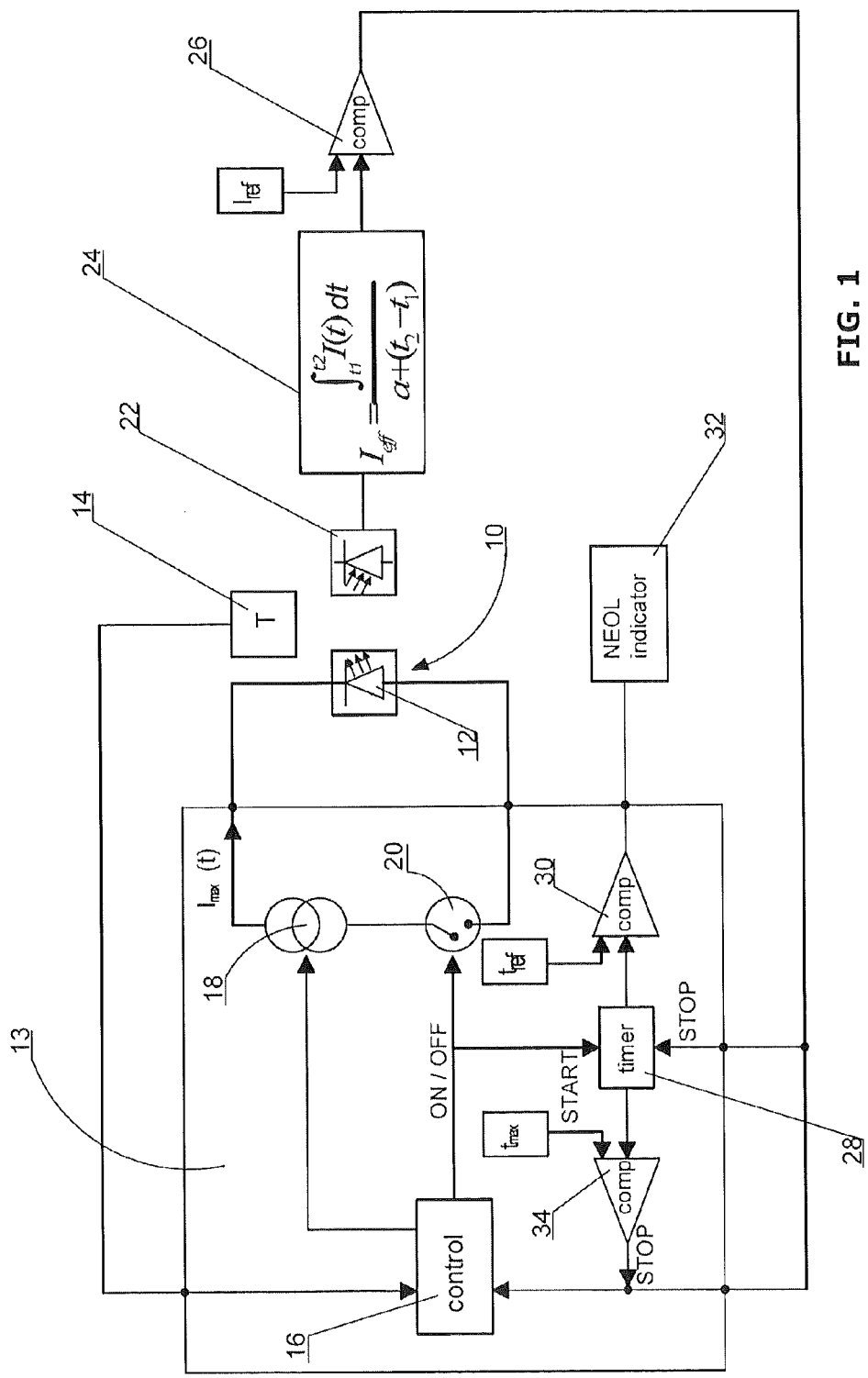
FIG. 1 schematically shows the circuitry in an anti-collision aircraft light according to one embodiment of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

In FIG. 1, reference numeral 10 represents the plurality of light sources which according to the invention are LEDs. The LEDs 10 are operated by means of a control unit 13 which sets an operating current $I_{MAX}(T)$. To this end, the ambient temperature of the anti-collision aircraft light is sensed by means of a temperature sensor 14. The measuring signal of the temperature sensor 14 is fed to a central control circuitry 16 which in turn controls a current source 18. Switching on and off the operation current is controlled by the control circuitry 16 and a corresponding switch 20.

The light emitted by the anti-collision aircraft light is sensed by means of an optical sensor 22 such as a photosensor. The measured signal of the optical sensor 22 is fed to an integrator 24 integrating the measured signal i.e. integrating the light intensity of the light emitted by the LEDs 10.

The output signal of the integrator 24 is compared to a threshold value $I_{ref}$ for the light intensity to be reached per each flashing interval. A corresponding comparator 26 creates an output signal fed to the central control circuitry 16 of the control unit 12 for switching off the operating current for the LEDs 10.

Moreover, the output signal of the comparator 26 is supplied to a timer 28 which is started upon switching on the operating current at the beginning of a flashing interval. Accordingly, the timer counts and measures the length of each flashing interval. The length of the interval is compared to a pre-set value $T_{ref}$. To this end, a comparator 30 is provided. If the length of the flashing interval becomes as long as the pre-set value $T_{ref}$, the end of the useful life of the LEDs 10 is approaching. Accordingly, a corresponding warning signal is generated in a near-end-of-life (NEOL) indicator 32. The warning signal can be e.g. an optic and/or acoustic signal.

For safety reasons, the control unit 13 comprises a further time comparator 34 which compares the length of a flashing interval to a maximum allowable time interval $T_{MAX}$. This comparator 34 outputs a stop or switch-off signal for the central control circuitry 16 to terminate current supply to the LEDs 10.

FIG. 2 shows how the maximum possible light intensity I of the LEDs 10 decreases over time depending on the history of the operating currents and the ambient temperature of the anti-collision aircraft light.

The main features and aspects of the present invention can be summarized as follows.

As mentioned above, this invention solves the issue of achieving high visibility with a discontinuously operated Blondel-Rey effective candela controlled light. The Blondel-Rey method to calculate visibility of a flashing light is embedded in today's legislation of the leading aviation authority and cannot be changed, but the actual attention raising properties do not match the human perception for which shorter and more intensive flashes are required as they attract more attention than the Blondel-Rey calculation method suggests. Flashes based on high intensity and short duration are preferable over lower intensity and longer duration flashes despite that they may result in similar effective candela calculations per Blondel-Rey.

$$I_{eff} = \frac{\int_{t_1}^{t_2} I(t)dt}{a + (t_2 - t_1)}$$

where I(t) is the instantaneous luminous intensity of the flash, $(t_2-t_1)$ is the duration of the flash (flash interval), and a is a visual time constant, namely 0.2 s, known as the Blondel-Rey constant.

The numerator of the equation is the time-integral of I(t), which is given in the unit of cd·s.

LEDs degrade in a compound fashion over temperature as well as over time. The key element of this invention is to control the light (preferably) in-situ in such a way that the emitted light always stays within a predetermined ecd (effective Candela value according to Blondel-Rey) window, over the useful life of the unit. Therefore the light operates with a primarily constant current close to the safe maximum current of the LED and the flash is shut off once the emitted light is "sufficient". "Sufficient" can be determined directly with sensors or indirectly over operation conditions of the LED. The actual duration is a function of the emitted light of the LED. Once the useful life of the unit is coming to an end, the flash is exceeding a predetermined duration which may trigger a near-end-of-life process that could be used to indicate that the unit has to be serviced.

The structure of the invention is that a dynamic adjustment of the ecd of a an LED flashlight is desirable to prolong useful life and not unnecessarily overdrive the unit while maintaining a sufficient attraction raising perception, in a fashion that complies with legislation and human factors. The LED has a luminous output that varies significantly over temperature and aging-related degradation. The maximum allowable current depends on the momentary operational temperature of the LED. The strategy is to keep the current close to the maximum allowable amperage wherein reducing the flash-duration is sufficient to meet a predetermined value per Blondel-Rey.

There are various embodiments possible, especially for the logic determining the actual, already achieved effective candela and the near-end-of-life determination, trigger mechanisms and type of indication (e.g. flag) that is raised when the unit has detected that it should be replaced soon.

The preferred embodiment though is based on a maximum intensity flash that is kept on for a variable duration until it has achieved a predetermined effective candela value. This value can be dialled in during final assembly or testing and is used as a reference for the comparator checking if the predetermined effective candela has already been achieved. Once the required intensity has been reached, the power for the LED light sources are turned off to preserve useful life of the LEDs. The current regulator restricts the maximum current flowing through the LEDs based on the LED type and ambient temperature. The timer measures the duration the flash has been on and feeds the result to the NEOL trigger logic. The trigger logic uses the duration of the pulse to check if the pulse length exceeds a predetermined duration and preferably compares it with the temperature the unit has been operated with to trigger a flag that End Of Life will be reached shortly. The flag could be i.e. a blinking diode.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. An anti-collision aircraft light, comprising:
   at least one LED and
   a control unit configured to operate the at least one LED in a pulsed manner,
   wherein the control unit comprises
   an ambient temperature sensor configured to sense the ambient temperature,
   an adjustable current control configured to set an LED operating current depending on the sensed ambient temperature,
   a light intensity sensor configured to sense the intensity of the light emitted from the at least one LED,
   an integrator connected to the light sensor and configured to integrate the sensed light intensity, and
   a comparator configured to compare the integrated light intensity to a threshold value,
   wherein the operating current for the at least one LED is interrupted as soon as the integrated light intensity is equal to the threshold value.

2. The anti-collision aircraft light according to claim 1, wherein the control unit further comprises a timer configured to be activated upon beginning of a pulsed operation control of the at least one LED and sensing a time interval within which the integrated sensed light intensity reaches the threshold value and wherein the control unit is configured to generate a warning signal indicative of the sensed time interval exceeding a pre-set value.

3. The anti-collision aircraft light according to claim 1, wherein the integrator is configured to calculate the light intensity corresponding to an effective light intensity according to a formula of Blondel-Rey.

4. A method for operating an anti-collision light comprising at least one LED and a control unit for operating the at least one LED in a pulsed manner, the method comprising:
   sensing an ambient temperature in a surrounding of the at least one LED,
   adjusting an operating current for the at least one LED, the adjustable operating current being dependent on the sensed ambient temperature,
   sensing an intensity of light emitted from the at least one LED when operated in a pulsed manner with an adjusted operating current, determining an amount of light emitted by the at least one LED during one pulse, and
   comparing the determined amount of the emitted light with a threshold value, wherein the adjusted operating current for the at least one LED is interrupted as soon as the determined amount of emitted light is equal to the threshold value.

5. The method according to claim 4, wherein a time interval from the beginning of an operating pulse of the at least one LED up to the point in time in which the determined amount of emitted light reaches the threshold value is measured and wherein the control unit generates a warning signal indicative of the sensed time interval exceeding a pre-set value.

6. The method according to claim 4, wherein the amount of emitted light is determined as effective light intensity according to a formula of Blondel-Rey.

* * * * *